United States Patent

Bryniarski et al.

Patent Number: 5,974,182
Date of Patent: Oct. 26, 1999

[54] PHOTOGRAPHIC IMAGE COMPRESSION METHOD AND SYSTEM

[75] Inventors: Gregory Richard Bryniarski; Brian Richard Wilson, both of Rochester, N.Y.

[73] Assignee: Eastman Kodak Company, Rochester, N.Y.

[21] Appl. No.: 08/842,453

[22] Filed: Apr. 24, 1997

[51] Int. Cl.[6] .................................................. G06K 9/34
[52] U.S. Cl. ......................................................... 382/232
[58] Field of Search ..................................... 382/232, 233, 382/234, 235, 236, 238, 239, 240, 243; 358/261.4, 404, 426, 427, 444; 348/405, 409, 415, 417, 418, 419, 420, 422

[56] References Cited

U.S. PATENT DOCUMENTS

| | | |
|---|---|---|
| 4,903,317 | 2/1990 | Nishihara et al. ..................... 358/262.1 |
| 5,168,374 | 12/1992 | Morimoto . |
| 5,265,180 | 11/1993 | Golin . |
| 5,301,242 | 4/1994 | Gonzales et al. . |
| 5,426,463 | 6/1995 | Reininger et al. . |
| 5,452,102 | 9/1995 | Yokoyama et al. ..................... 358/426 |
| 5,467,134 | 11/1995 | Laney et al. . |
| 5,491,761 | 2/1996 | Kim . |
| 5,533,138 | 7/1996 | Kim et al. . |
| 5,577,190 | 11/1996 | Peters . |
| 5,666,161 | 9/1997 | Kohiyama et al. ..................... 358/439 |

*Primary Examiner*—Jose L. Couso
*Attorney, Agent, or Firm*—James D. Leimbach

[57] ABSTRACT

A method of compressing a collection of images using a variable compression function. In one aspect, the method comprises compressing the set using an initial function. The size of the resulting compressed image set is compared with a predetermined storage capacity. The function is altered based on the difference between the size of the resulting compressed image set and the predetermined storage capacity. The collection of images are compressed using the altered function.

12 Claims, 4 Drawing Sheets

PHOTOGRAPHIC IMAGE COMPRESSION METHOD AND SYSTEM

FIELD OF THE INVENTION

This invention relates to a method and apparatus for compressing a collection of images for storage.

BACKGROUND OF THE INVENTION

Recently services are being offered where a customer requests a photofinisher to process (that is, chemically develop a roll of film carrying a latent image to yield a fixed image) a roll of film and also provide digitized versions of the photographic images on a storage medium, such as a floppy disk. Because photographic images require large amounts of digital data, and the floppy disk has very limited storage capacity, the digital photographic image files are typically compressed using standard compression methods.

For image compression systems, a fundamental distinction can be made between lossy and lossless compression systems. A lossless compression system will compress and decompress image data in such a way that decompressed image data is exactly the same as the originally input image data. In comparison, the decompressed image data resulting from a lossy compression system will be different from the originally input image data. The human visual system has a minimum detectable threshold that allows us to perceive as the same an original and its decompressed image that have some small amount of real difference between them. By taking advantage of this human visual system threshold, a lossy compression system can provide a higher compression rate without visible degradation in an image.

Another fundamental distinction between image compression systems can be made between variable-rate systems and fixed-rate systems. Rate refers to the number of bits required after compression to represent a given spatial unit (for example, bits/pixel, bits/image, bits/image collection, and the like). A variable-rate compression system is one that produces a variable output data rate, depending on the properties of the input image data. Conversely, a fixed-rate compression system is one that produces a constant output data rate, regardless of the input image data.

The fundamental trade-off in lossy compression systems is between compressed data rate and image quality. For a constant level of image quality, a higher rate is generally needed for an image or image region containing significant detail (that is, signal energy), as compared to a relatively low detail image or image region. A variable-rate system is well-suited to providing a constant level of image quality, since bits are expended as needed to match the image or image region characteristics. In comparison, a fixed-rate system must compromise on image quality for those images or image regions where the available number of bits is insufficient.

When photographic images are compressed using a variable rate lossy compression method, such as JPEG, it is difficult to predict what the final compressed file storage space will be because the actual image content of an individual image will impact the final file storage space of that image. It is easy to predict the size of a compressed file when a fixed compression method is employed.

In designing a compression system, an example of a variable-rate lossy compression method is the JPEG (Joint Photographic Experts Group) international standard, as described by W. B. Pennebaker and J. L. Mitchell, "JPEG: Still Image Data Compression Standard," Van Nostrand Reinhold, New York 1993. This reference and all other references cited herein are incorporated by reference. The JPEG system parameter that exerts the largest effect on the compressed data rate is the quantization table specification. There are many possible methods to adjust the JPEG quantization table in order to achieve a predictable file storage space for the image collection. The most straightforward method is to start with an initial quantization table, compress an image or collection of images, and then adjust the initial table by a multiplicative scaling factor if the desired rate is not achieved. A scaling factor greater than one results in more quantization and hence a lower rate than achieved with the initial quantization table. Likewise, a scaling factor less than one results in less quantization and hence a higher rate than that achieved with the initial quantization table. If the desired rate is not achieved after the first adjustment, this adjustment process can be iterated (that is, repeated) until the rate constraint is met. To make such an approach useful in practice, it is necessary to achieve the desired rate in only a few iterations.

When the same JPEG parameters are used to compress two different images, each image results in a different final compressed file storage space due to the contents of the different images. This makes it impossible to predict how much file storage space is required to store a collection of images until the images have actually been compressed.

When trying to guarantee that a collection of compressed images will fit on a limited storage medium such as a floppy disk, a fixed set of JPEG compression parameters could be chosen to insure that all images can be compressed to fit on the disk even if all of the images were highly detailed. Such a set of fixed compression parameters, because they are selected to accommodate the worst case scenario of all images containing high amounts of detail, will over-compress most images. Unfortunately, the more a photographic image is compressed, the more image quality that is lost. Over-compression of photographic images using a lossy compression method results in lost image quality.

In addition, when a consumer has a photographic film processed and the images thereon scanned, with some images the degree of compression required even to barely fit the images on a limited storage medium, such as a diskette, will produce compressed images with unacceptable loss in image quality.

It is therefore desirable to have a compression method that determines the minimum compression necessary for a collection of images so that the actual compressed collection will fit within a limited storage space, such as that provided by a floppy disk, without being over-compressed, so that almost all the available storage space is used. It would also be desirable if for a given collection of images, that the compression method recognizes that the compression required to fit the collection on such a fixed capacity medium produces unacceptable losses and compensates for this situation.

SUMMARY OF THE INVENTION

The present invention then, provides a method for determining the minimum compression needed to fit a collection of images within a limited storage space without undue wasting of the available space. That is, the present invention provides the required degree of compression to fit the collection within the limited storage space, but with minimum image quality loss from a lossy compression method. Furthermore, the present invention provides a means for evaluating, for a given collection of images, when the compression required would produce unacceptable image quality loss, and for compensating for this situation.

In one aspect of the present invention there is provided a method of compressing a collection of images using a variable compression function, comprising:

(a) compressing the set using an initial function;

(b) comparing the size of the resulting compressed image set with a predetermined storage capacity;

(c) altering the function based on the difference between the size of the resulting compressed image set and the predetermined storage capacity;

(d) compressing the collection of images using the altered function.

In another aspect of the present invention, there is provided a method of compressing a collection of images using a variable compression function, comprising:

(a) compressing the set using an initial function;

(b) comparing the size of the resulting compressed image set with a predetermined storage capacity;

(c) determining an altered compression function based on the difference between the size of the resulting compressed image set and the predetermined storage capacity; and (d) comparing the altered compression function with a predetermined maximum compression function and, when the maximum compression function is exceeded, splitting the collection of images into multiple image sub-collections.

Apparatus for executing the above methods is also provided.

The apparatus and method of the present invention can provide the minimum necessary lossy image compression for all collections of images. That is, a collection of images can be compressed just enough to fit on the storage medium and not more. Because image compression is minimized while meeting the foregoing storage medium capacity constraint, image quality of the compressed images is maximized. The use of the file storage space error (that is, the difference between the size of a compressed image collection and the storage media capacity) to adjust the degree of compression (that is, the compression function), results in much more accurate file compression, as compared to methods that would just select the next available compression increment provided by a look up table. Furthermore, the method of the present invention can automatically divide a collection of images into sub-collections when the resulting required compressed collection storage space exceeds the storage media capacity such that an unacceptably high degree of compression would be required (which leads to compressed images of unacceptable quality). Also, each sub-collection of a divided collection of images can be stored by the method at a minimum necessary compression for each storage medium (such as each floppy disk), resulting in the maximum image quality for each image collection. Because all images in an image collection are compressed using the same parameters, the images are perceived to have a higher quality by users. The method and apparatus of the present invention, while they can be used for various purposes, have particular application in scanning and storing images from a developed photographic film onto one or more fixed capacity media, such as diskettes.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 2:
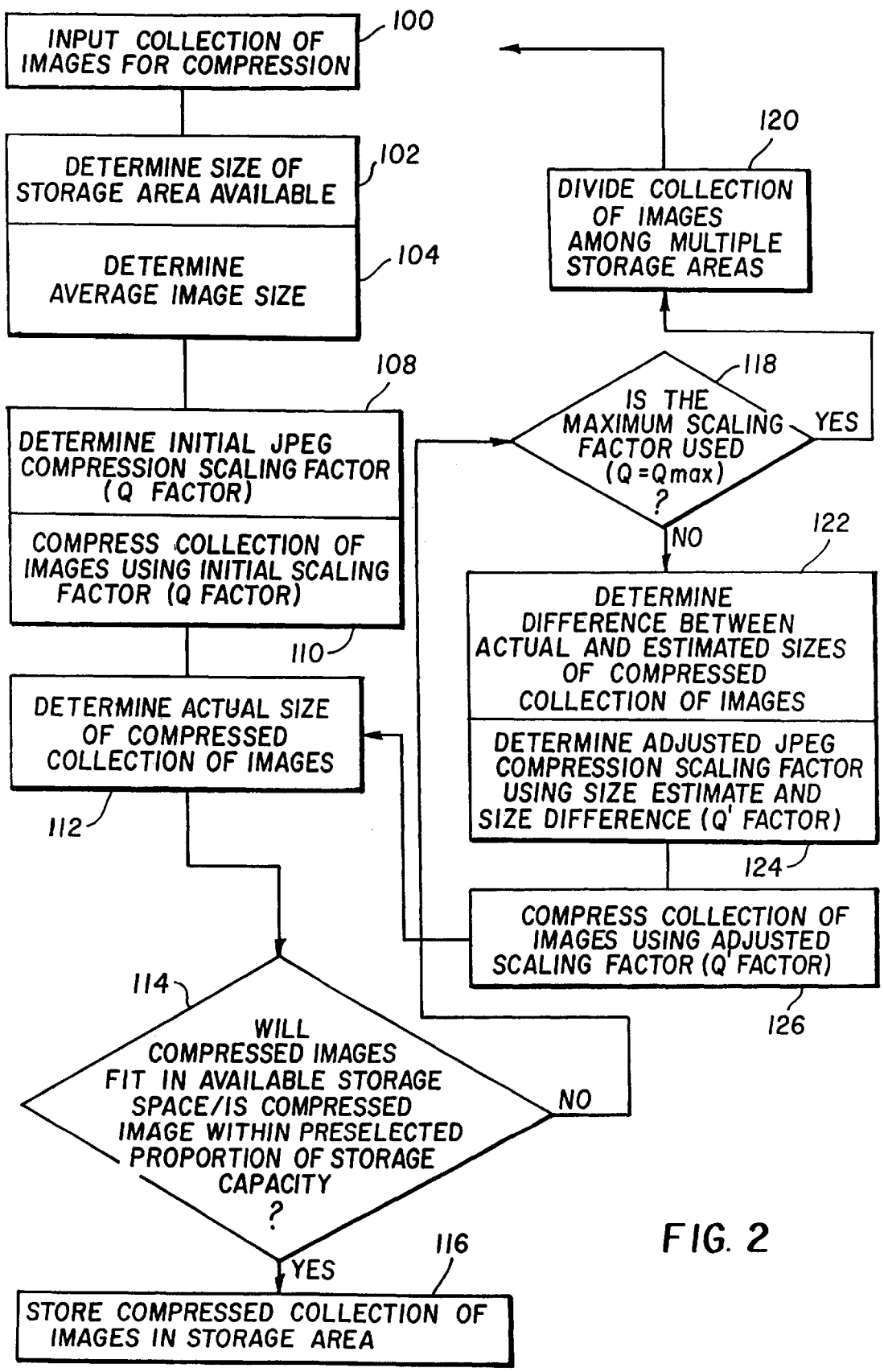
FIG. 2 is a flowchart illustrating a method of the present invention.
Figure 3:
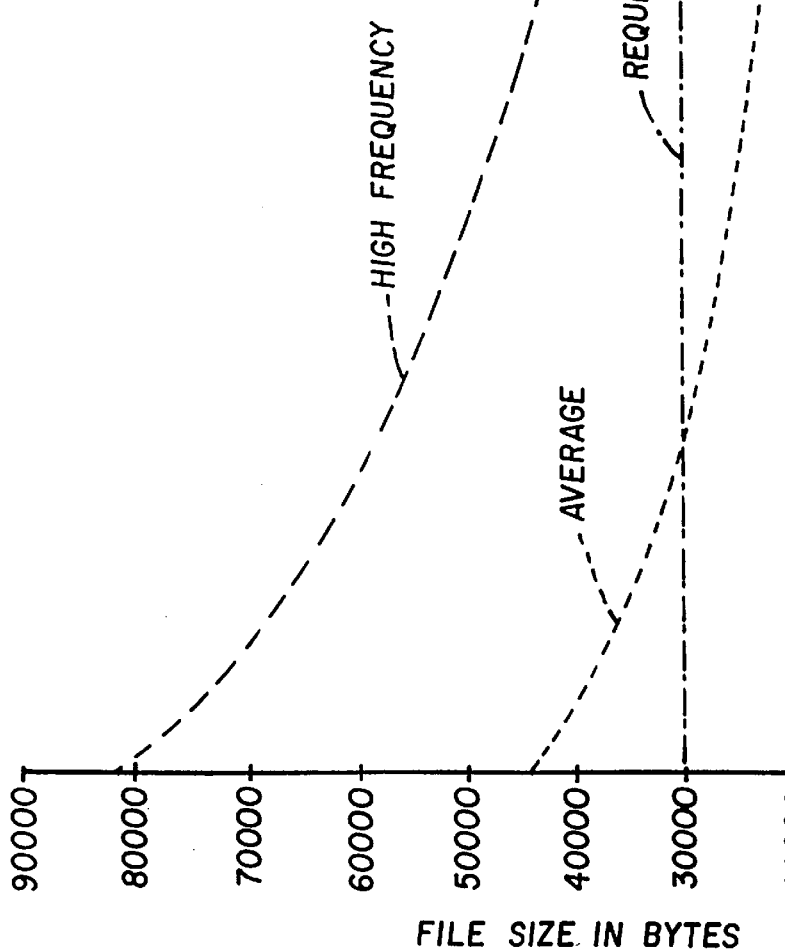
FIG. 3 is a graph showing the relationship of compressed file storage space versus scaling factor for high, average and low frequency images.
Figure 4:
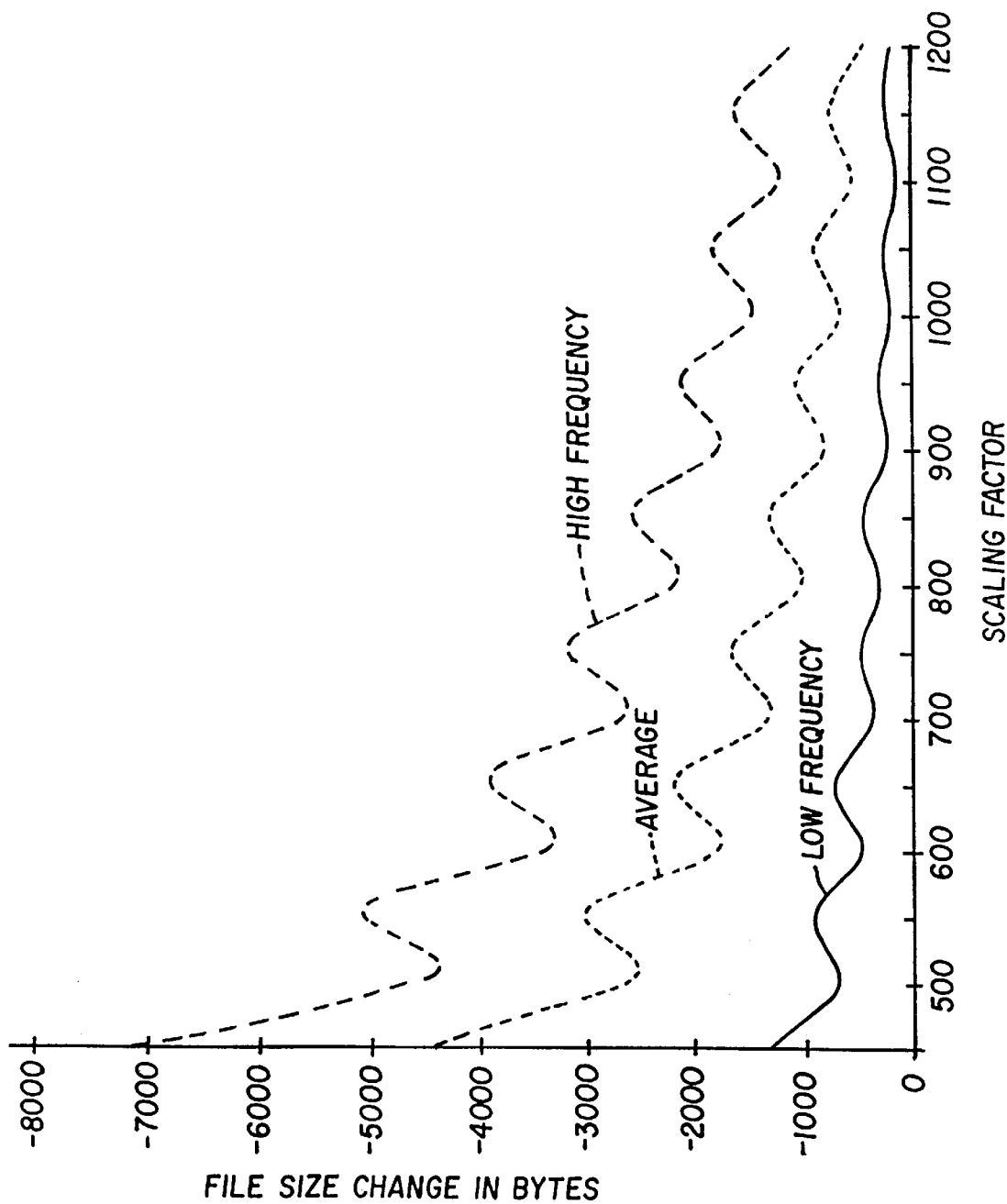
FIG. 4 is a graph showing the change in file storage space versus scaling factor for high, average and low frequency image contents.

Referring first to FIG. 3, this shows a graph plotting the resulting compressed file storage space versus a JPEG scaling factor. Images containing little detail result in smaller compressed file storage space, while images containing lots of detail have dramatically larger compressed file storage spaces. Even using an average value (representing images with an average amount of detail) can result in large errors between the actual compressed file storage space and the estimated average compressed file storage space. FIG. 4 presents similar information, this time showing the rate of change in the compressed file storage space versus scaling factor (that is, FIG. 4 represents the change of slope in the plots of FIG. 3). The non-linear variability shown in these plots emphasizes the difficulty in predicting what the actual compressed image file storage space will be using any given fixed set of JPEG compression parameters. Thus, it can be seen from FIGS. 2 and 3 when photographic images are compressed using a variable rate lossy compression method, such as JPEG, it is difficult to predict what the final compressed file storage space will be since the actual image content of an individual image will impact the final file storage space of that image.

Figure 1:
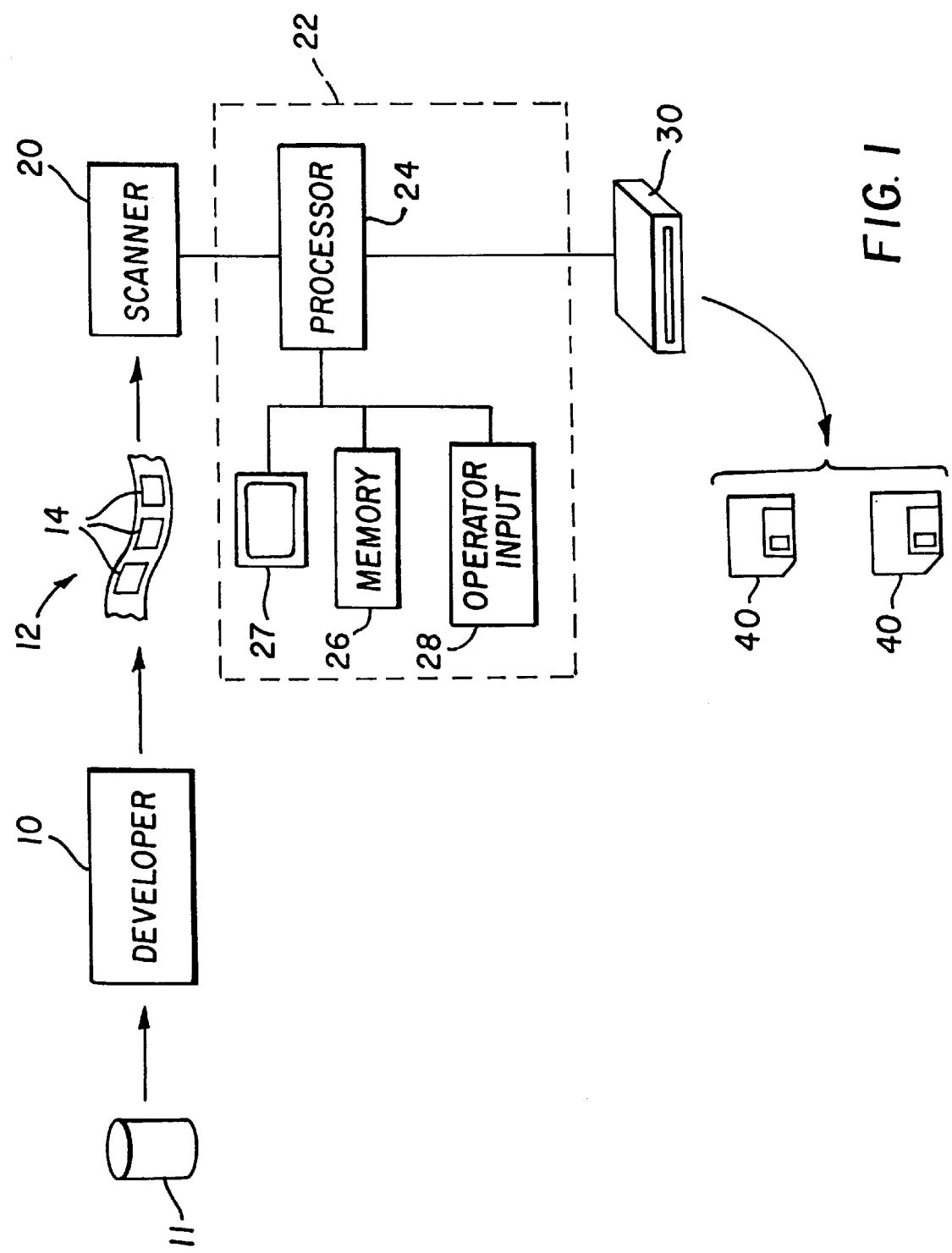
FIG. 1 is a block diagram illustrating an apparatus of the present invention.

Referring to FIG. 1, the apparatus may be that used in a typical retail or wholesale photofinishing operation. There is included a developer 10 which can chemically process an exposed silver halide photographic film 12 (delivered to developer 10 inside canister 11) bearing latent images, to provide a collection of physical images 14 in fixed form on the film. A scanner 20 is capable of scanning each of the series of images 14 on developed film 12 to yield a corresponding digital image signal, in a known manner using a source of illumination which passes through images 14 (or is reflected from images which may be on a reflective base, such as paper prints) onto a sensor. Scanner 20 is sometimes referred to as a film digitizer. Such scanners take a variety of forms and the various common aspects of film digitizing, particularly line illumination and linear CCD-based digitizers, are described in greater detail in commonly assigned U.S. Pat. No. 5,012,346. However, other scanners, such as area array scanners, are also well known. An image signal processing apparatus 22 includes a digital processor 24 connected to receive the digital image signals (a digital image collection) corresponding to the film images and compress them using JPEG or some other lossy variable compression function algorithm. Processor 24 is preferably a general purpose digital computer processor suitably programmed to execute the steps of the method of the present invention. However, it will be understood that the functions of suitable programmed processor 24 could be provided in part or completely by fixed circuit elements. Apparatus 22 further includes a memory 26 for holding data required by processor 24 as well as a media writer 30. An optional monitor 27 and optional operator input 28 (such as a keyboard or mouse) may be provided to allow a system operator to view progress of scanning rolls of film and input various commands (such as stop, start, redo a particular film 12, and the like). Writer 30 can preferably write onto one or more removable blank writable media 40 simultaneously, which may be fed automatically into and out of writer 30 under control of processor 24. The media on which writer 30 writes, is a fixed storage capacity media most typically in the form of a magnetic diskette. However, writer 30 can be such as to be capable of recording on other media, such as any optical or magnetic media, or solid state media, of fixed storage capacity. The components of the apparatus of FIG. 1 are typically found at the same location (that is, in the same building). However, one or more of the components can be positioned remotely from the other(s) (that is, in a different building which may be one or more miles away from the location housing other of the components). For example, developer 10 may be remote from the location of apparatus 22 and connected thereto over a suitable wired or wireless communication channel, such as the internet, another public network connection, or a dedicated communication channel (including a dedicated computer network).

In operation, a user brings or has sent to the location of developer 10, one or more exposed photographic canisters 11 each containing an undeveloped film carrying one or more latent images. Developer 10 then processes these to yield a collection (that is, more than one) of fixed images 14 on the film 12. The film 12 bearing the fixed image collection is then transferred to scanner 20 where a corresponding digital image collection is generated and transmitted to processor 24. In other cases, a user may simply bring in an already developed film strip 12 for scanning. Processor 24 then compresses the image collection (it will be understood at this point that the signal representing the image collection is being referenced) in accordance with the steps of the method discussed below, and causes the compressed image collection to be written by writer 30 onto a single removable storage medium 40 or causes image sub-collections (typically all of which are compressed) onto one or more removable storage media 40.

Turning now to FIG. 2, the sequence of steps by which the method of the present invention is executed by processor 24 will now be described. The collection of images is input (100) to processor 24. The predetermined storage capacity in the form of the size of a storage medium 40 on which the compressed image set will be stored, is determined (102). The size from step 102 is divided by the number of images in the collection to determine the predetermined average image size (104). A look-up table consisting of compression scale factors and compressed average image sizes at the respective scale factor is used to determine an initial scale factor (108). The different scale factors in a single JPEG compression algorithm provide different compression functions. The table is traversed until a scale factor is found with an average size less than or equal to the predetermined average image size (from step 104). The collection of images is compressed using the initial scale factor determined from step 108 (110). The resulting size of the collection is determined (112) followed by a determination if the compressed image collection will fit within the size of the storage space (114). If the collection does fit the compression process is complete and the collection is stored (116) on a single storage medium 40 by writer 30. If the collection does not fit then the method determines if the maximum scale factor was used (118) (that is, if a predetermined maximum compression function exceeded).

If the maximum scale factor was used then the collection of images is divided into two or more sub-collections each corresponding to one of a plurality of independent storage media 40 (120). Each of the sub-collections is then subjected to the cycle of steps 100 through 114, 118 and 120 using the sub-collection as the input collection at step 100, until it is determined that the maximum scaling factor has not been used (that is, step 118 is answered negatively). When images from a roll of a typical consumer's film (for example, containing up to 12, 24 or 36 images) are compressed using the method, and assuming that the storage medium 40 is a magnetically recording diskette of about 1.44 Mbytes in capacity, typically step 118 will be answered negatively on the first or second cycle at most.

If the maximum scale factor was not used then the difference between the actual size of the collection (from step 112) and the predetermined average size (from step 104) is determined (122). The predetermined average image size is adjusted by this difference and the same look-up table again traversed to find a new scale factor (124). In this manner, the compression function is altered based on the difference between the size of the resulting compressed image set and the predetermined storage capacity. The collection of images is then compressed using this new scale factor (126) (that is, the altered compression function). The actual size of the compressed image collection is then determined (back to step 112).

The data for the look-up table described above, is obtained as an average figure using a large group of images (such as several hundred, for example about 600) of a type to which the collection belongs. For example, if it is expected that the typical collection of images to be compressed are those of consumers, a very large group of many consumer images is obtained and each image of the group compressed using each compression scale factor in the table. The average size of the resulting compressed images is then associated with that compression scale factor in the table. Similarly, the predetermined maximum scale factor can be obtained using such a large group of images, the maximum allowable scale factor being the maximum value which still on average yields perceptibly adequate results for the class of users originating images of the type of which the large group is composed. Note that the look-up table and maximum scale factor will be set for a given resolution of the images in the collection, such as about 700 pixels by about 500 pixels. Whenever it is expected that images of a different resolution will be handled, a new look-up table and maximum allowable scale factor should be determined using a very large set of images having that new resolution.

It will be appreciated from the above, that as many iterations as are required can be performed through the cycle of steps 112, 114, 118, 122, 124 and 126 as are required until step the compressed collection of images are reduced to a size which will fit on the storage medium 40 (that is, step 114 is answered affirmatively). As already discussed above, as many cycles as necessary can be performed through steps 118, 120 until the maximum scale factor ("Q") is not used in step 118. Furthermore, as to the alteration of the scaling factor, while this has been described using the look up table (which is a stepwise adjustment), other methods of alteration include interpolation, extrapolation or incremental adjustment, in any of which the scaling factor adjustment is a function of the difference between the size of the resulting compressed image collection and the predetermined storage capacity.

Either or both iterations in the preceding paragraph can be performed a sufficient number of times so that not only does the compressed image collection fit within the storage media, but is of a size no less than a preselected proportion of the predetermined storage capacity (for example, no less than 75%, 80%, or 95% of the predetermined storage capacity). This ensures that close to all the storage space in a medium is utilized thereby maximizing the image quality. This additional step is illustrated in FIG. 4.

The invention has been described in detail with particular reference to certain preferred embodiments thereof, but it will be understood that variations and modifications can be effected within the spirit and scope of the invention.

PARTS LIST

| PARTS LIST | |
|---|---|
| 10 | Developer |
| 11 | Canister |
| 12 | Film |
| 14 | Images |
| 20 | Scanner |
| 22 | Apparatus |
| 24 | Processor |
| 26 | Memory |
| 27 | Monitor |
| 28 | Optional Operator Input |
| 30 | Writer |
| 40 | Storage Media |
| 100–126 | Steps |

We claim:

1. A method of compressing a collection of images using a variable compression function, comprising:
   (a) determining an average image size;
   (b) compressing the collection to achieve the average image size using an initial function;
   (c) comparing the size of the resulting compressed image set with a predetermined storage capacity;
   (d) altering the function based on the difference between the size of the resulting compressed image set and the predetermined storage capacity;
   (e) compressing the collection of images using the altered function;
   (f) repeating steps (b) to (d) using at least one image sub-collection as the collection of images;
   (g) compressing the collection of images using the altered compression function; and
   (h) repeating steps (b) through (g) as necessary until the size of the compressed image set is no greater than the predetermined storage capacity and is no less than a preselected proportion of the predetermined storage capacity.

2. A method according to claim 1 wherein steps (c) through (e) are repeated as necessary until the size of the compressed image set is no greater than the predetermined storage capacity and is no less than a preselected proportion of the predetermined storage capacity.

3. A method according to claim 1 wherein the initial function is based on a predetermined average image size.

4. A method according to claim 3 wherein the initial function is based on an estimated compressed size of the image set selected from a look up table.

5. A method according to claim 1 wherein the function is altered using interpolation, extrapolation, incremental adjustment, or stepwise adjustment.

6. A method according to claim 3 wherein the function is altered using stepwise adjustment by reference to the look up table.

7. A method of compressing a collection of images using a variable compression function, comprising:
   (a) determining an average image size;
   (b) compressing the set using an initial function;
   (c) comparing the size of the resulting compressed image set with a predetermined storage capacity;
   (d) determining an altered compression function based on the difference between the size of the resulting compressed image set and the predetermined storage capacity;
   (e) comparing the altered compression function with a predetermined maximum compression function and, when the maximum compression function is exceeded, splitting the collection of images into multiple image sub-collections;
   (f) repeating steps (b) to (d) using the image sub-collection as the collection of images;
   (g) compressing the collection of images using the altered compression function; and
   (h) repeating steps (b) through (g) as necessary until the size of the compressed image set is no greater than the predetermined storage capacity and is no less than a preselected proportion of the predetermined storage capacity.

8. A method according to claim 7 additionally comprising, for at least one image sub-collection, repeating steps (b) to (e) using the image sub-collection as the collection of images.

9. A method according to claim 7 additionally comprising, following step (g), storing the resulting compressed image set on a storage medium of the predetermined storage capacity.

10. An apparatus for compressing a collection of images using a variable compression function, comprising:
    (a) means for determining an average image size;
    (b) a first image compressor to compress the set using an initial function based on the average image size;
    (c) a comparator to compare the size of the resulting compressed image set with a predetermined storage capacity;
    (d) a function modifier to alter the function based on the difference between the size of the resulting compressed image set and the predetermined storage capacity;
    (e) a second compressor to compress the collection of images using the altered function;
    (f) means for applying the second compressor to implement the altered function until the size of the compressed image set is no greater than the predetermined storage capacity and is no less than a preselected proportion of the predetermined storage capacity.

11. An apparatus according to claim 10 additionally comprising repeating means for iteratively causing the image to be passed through components (b) through (e) as necessary until the size of the compressed image set is no greater than the predetermined storage capacity and is no less than a preselected proportion of the predetermined storage capacity.

12. An apparatus for compressing a collection of images using a variable compression function, comprising:
    (a) an image compressor to compress the set using an initial function that is based upon an average image size;
    (b) a comparator to compare the size of the resulting compressed image set with a predetermined storage capacity;
    (c) a function modifier to determine an altered compression function based on the difference between the size of the resulting compressed image set and the predetermined storage capacity;
    (d) a second comparator to compare the altered compression function with a predetermined maximum compression function;

(e) an image sub-collection generator to split the collection of images into multiple image sub-collections when the maximum compression function is exceeded; and (f) means for compressing at least one of the sub-collection of images as the collection of images using the altered compression function until the size of the compressed image set is no greater than the predetermined storage capacity and is no less than a preselected proportion of the predetermined storage capacity.

* * * * *